United States Patent
Hashimoto et al.

(10) Patent No.: US 10,845,762 B2
(45) Date of Patent: Nov. 24, 2020

(54) REDDISH LIGHT EMITTING PHOSPHORESCENT PHOSPHOR

(71) Applicant: NEMOTO & CO., LTD., Suginami-ku (JP)

(72) Inventors: Atsunori Hashimoto, Suginami-ku (JP); Yasushi Aoki, Suginami-ku (JP)

(73) Assignee: NEMOTO & CO., LTD., Suginami-ku (JP)

( * ) Notice: Subject to any disclaimer, the term of this patent is extended or adjusted under 35 U.S.C. 154(b) by 354 days.

(21) Appl. No.: 15/760,906

(22) PCT Filed: Nov. 18, 2016

(86) PCT No.: PCT/JP2016/084350
§ 371 (c)(1),
(2) Date: Mar. 16, 2018

(87) PCT Pub. No.: WO2017/090541
PCT Pub. Date: Jun. 1, 2017

(65) Prior Publication Data
US 2018/0259908 A1    Sep. 13, 2018

(30) Foreign Application Priority Data

Nov. 27, 2015  (JP) .................................. 2015-231905
Mar. 14, 2016  (JP) .................................. 2016-050116

(51) Int. Cl.
*G04B 19/32*    (2006.01)
*C09K 11/77*    (2006.01)
(Continued)

(52) U.S. Cl.
CPC .......... *G04B 19/32* (2013.01); *C09K 11/7706* (2013.01); *C09K 11/7768* (2013.01);
(Continued)

(58) Field of Classification Search
CPC .. C09K 11/7774; C09K 11/0883; G04B 19/32
See application file for complete search history.

(56) References Cited

U.S. PATENT DOCUMENTS 5,424,006 A    6/1995  Murayama et al.
7,123,550 B2*  10/2006 Galli ...................... G04B 19/30
                                                          368/227
(Continued)

FOREIGN PATENT DOCUMENTS

CN    102304359 A    6/2005
CN    103333692 A    10/2013
(Continued)

OTHER PUBLICATIONS

Translation of CN 105567235, May 11, 2016.*
International Search Report dated Dec. 20, 2016, in PCT/JP2016/084350 filed Nov. 18, 2016.

*Primary Examiner* — C Melissa Koslow
(74) *Attorney, Agent, or Firm* — Oblon, McClelland, Maier & Neustadt, L.L.P.

(57) ABSTRACT

Provided is a reddish light emitting phosphorescent phosphor, that is efficiently excited with visible light and is chemically stable. The phosphorescent phosphor comprises a compound represented by $MSi_2O_2N_2$:Yb,R, wherein M is at least one metal element selected from strontium, calcium, barium, and magnesium, and R is at least one element selected front erbium, holmium, gadolinium, praseodymium, terbium, dysprosium, neodymium, bismuth, scandium, and chromium. The phosphorescent phosphor is an excellent phosphorescent phosphor having a reddish afterglow.

20 Claims, 5 Drawing Sheets

(51) Int. Cl.
  *H01J 63/02*  (2006.01)
  *H05B 33/14*  (2006.01)
(52) U.S. Cl.
  CPC .......... *C09K 11/7769* (2013.01); *H01J 63/02* (2013.01); *H05B 33/14* (2013.01)

(56) References Cited

U.S. PATENT DOCUMENTS

| | | | |
|---|---|---|---|
| 8,877,096 B2 * | 11/2014 | Pan ...................... | C04B 35/01 252/301.36 |
| 2003/0151980 A1 * | 8/2003 | Farash ................ | G04B 19/025 368/21 |
| 2007/0132360 A1 | 6/2007 | Hildenbrand et al. | |

FOREIGN PATENT DOCUMENTS

| | | | |
|---|---|---|---|
| CN | 104232088 A | | 12/2014 |
| CN | 105567235 | * | 5/2016 |
| JP | 2543825 B2 | | 7/1996 |
| JP | 2004-223975 A | | 8/2004 |
| JP | 2008-521994 A | | 6/2006 |
| JP | 2007-513469 A | | 5/2007 |
| JP | 2007-238898 A | | 9/2007 |
| JP | 4105759 B2 | | 6/2008 |
| JP | 2012-97183 A | | 5/2012 |
| KR | 10-2010-0087934 A | | 8/2010 |
| WO | WO 2006/059260 A1 | | 6/2006 |
| WO | WO 2007/145167 A1 | | 12/2007 |

* cited by examiner

[FIG. 1]
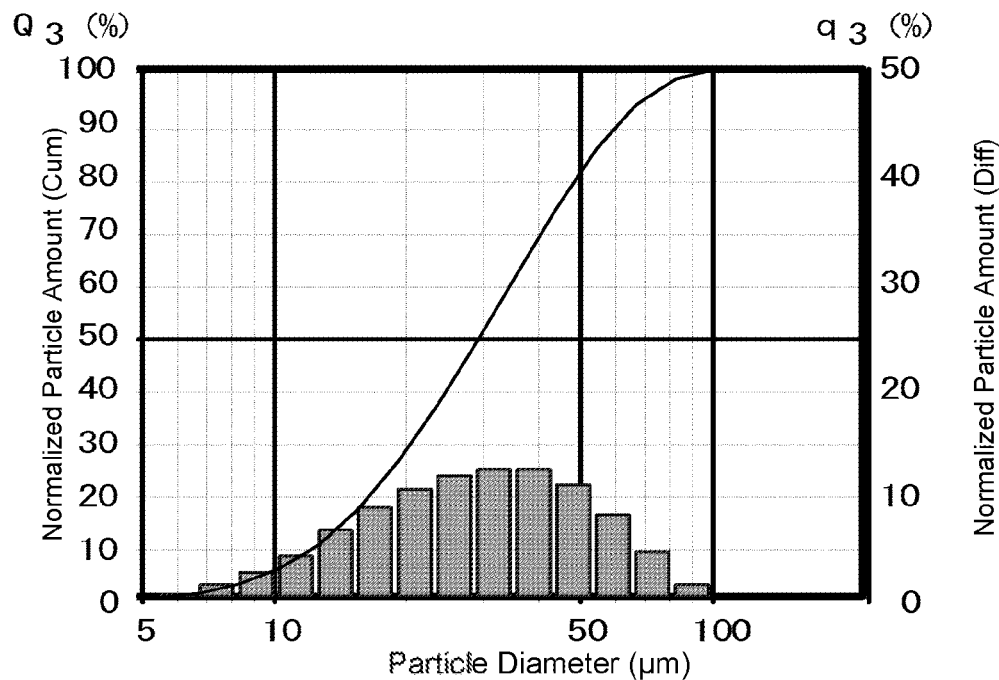
[FIG. 2]
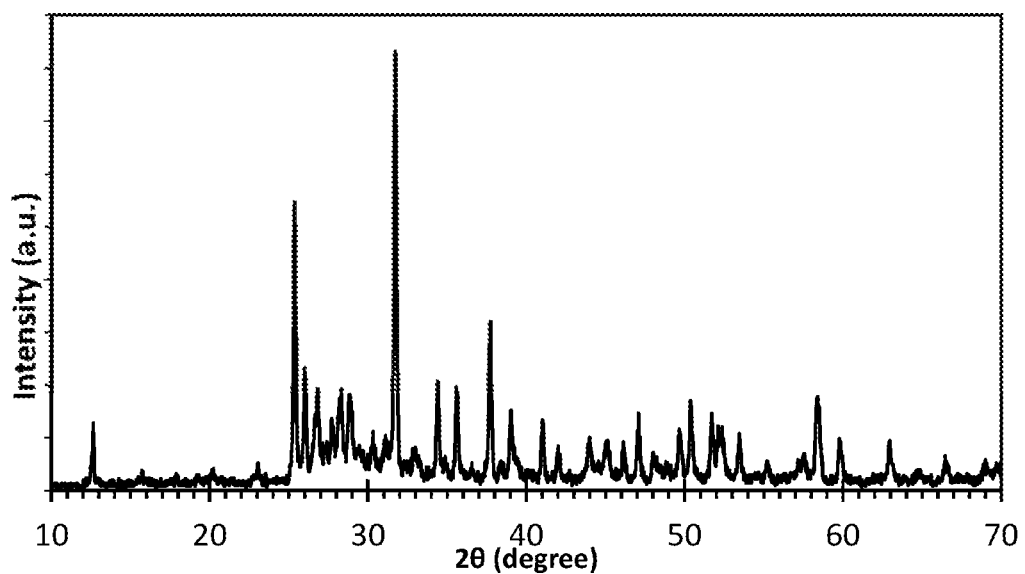

[FIG. 3]
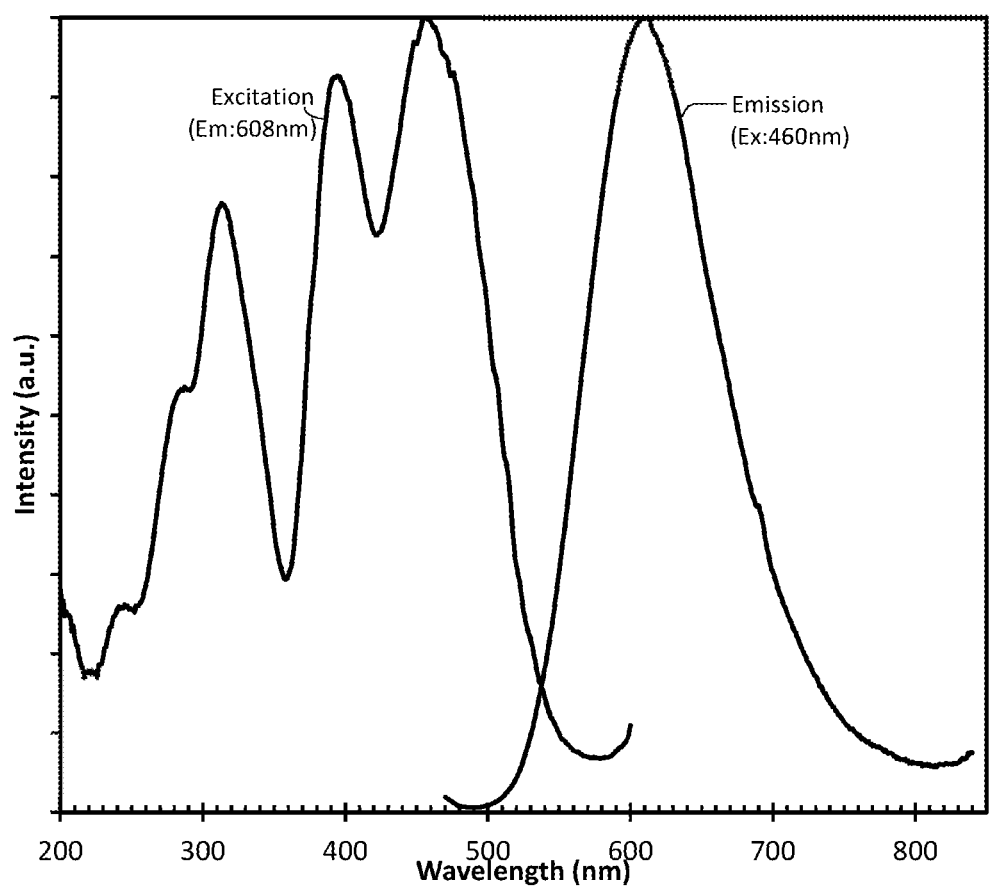

[FIG. 4]
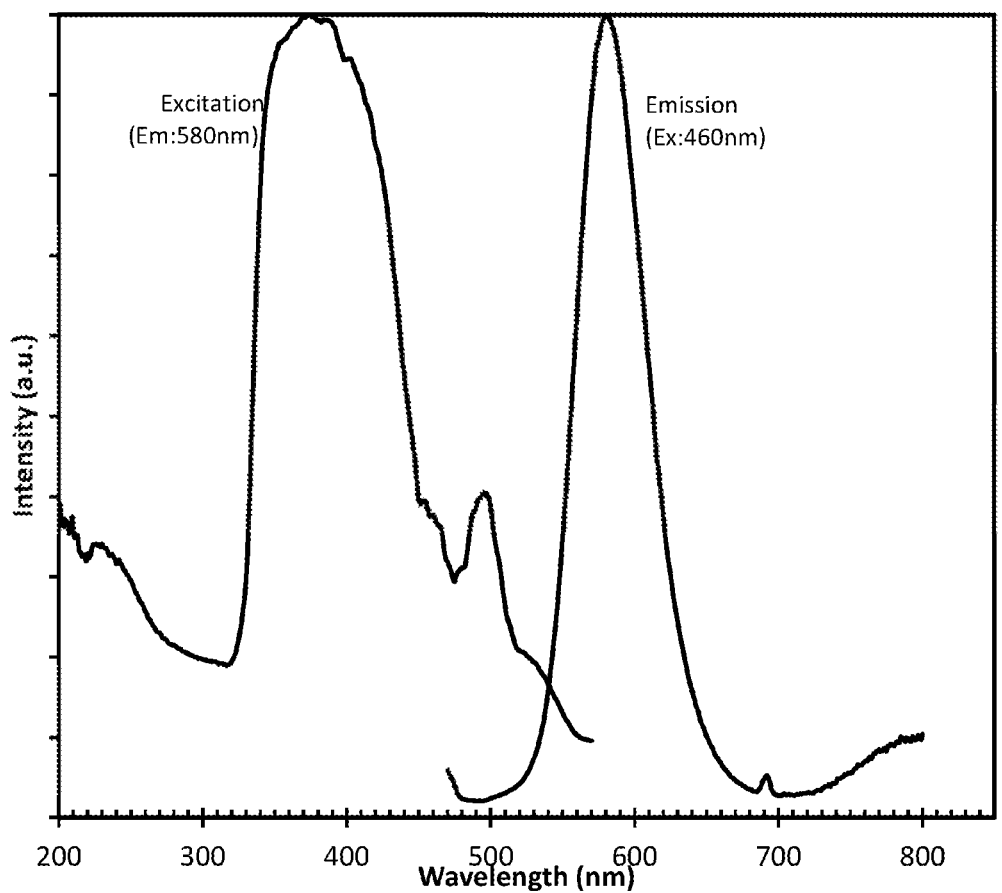

[FIG. 5]
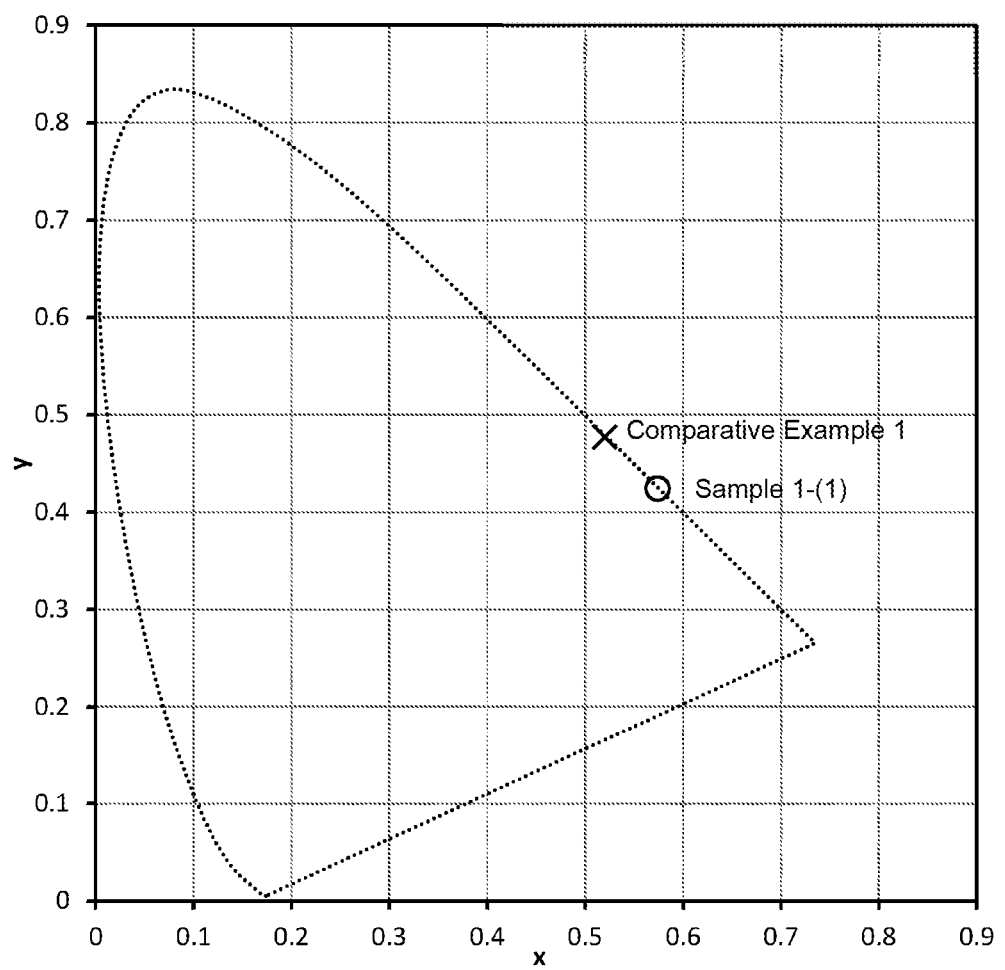

[FIG. 6]
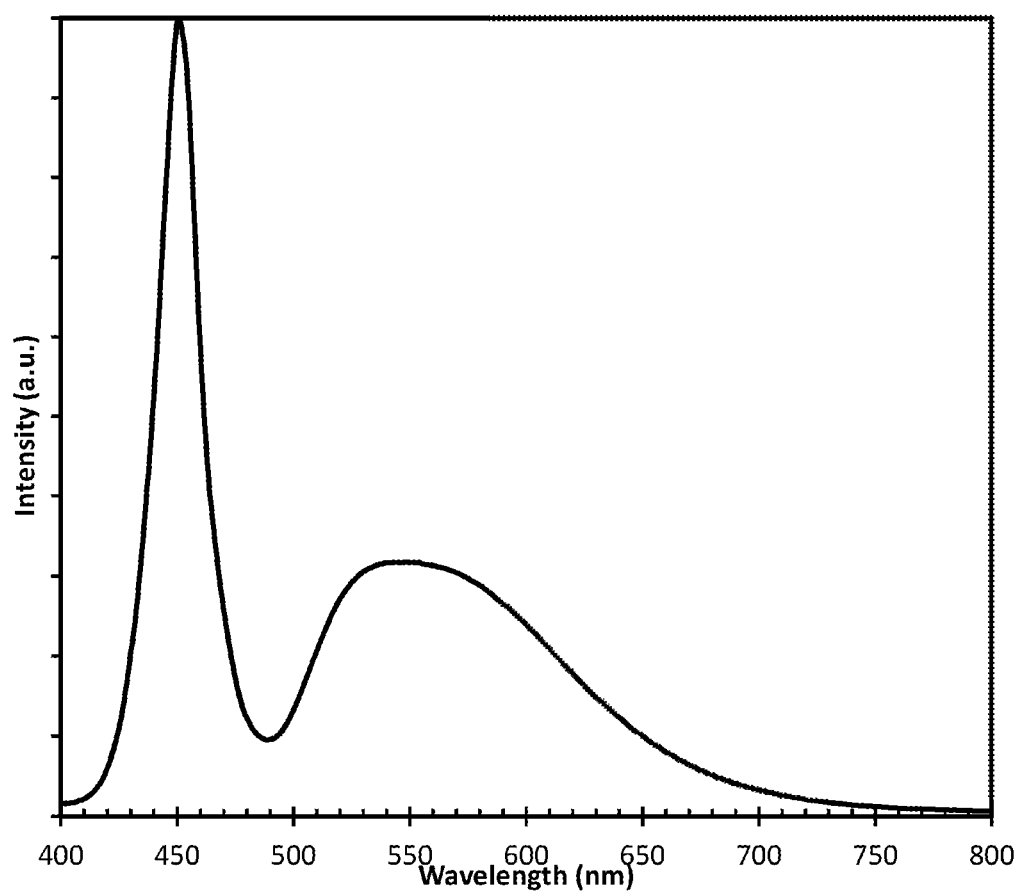

REDDISH LIGHT EMITTING PHOSPHORESCENT PHOSPHOR

TECHNICAL FIELD

The present invention relates to a reddish afterglow emitting phosphorescent phosphor.

BACKGROUND ART

In general, the afterglow time of a phosphor is extremely short, and the emission of a phosphor rapidly decays when external excitation is ceased. However, in rare cases, even after the cessation of external excitation, some phosphors maintain afterglow of a level perceivable with the naked eye for a considerably long period of time (from a few tens of minutes to a few hours); such a phosphor is referred to as a phosphorescent, phosphor or a phosphorescent material in discrimination of such a phosphor from common phosphors.

Examples of the known phosphorescent phosphors include: sulfide phosphors such as CaS:Bi (purple-blue emission), CaSrS:Bi (blue emission), ZnS:Cu (green emission), ZnCdS:Cu (yellow-orange emission) and ZnS:Cu,Mn (orange-red emission). Any of these sulfide phosphors suffers from a problem such that the phosphors are chemically unstable, or poor in heat resistance or light resistance.

As an oxide-based phosphorescent phosphors having nigh afterglow luminance that have been developed recently, for example, a phosphorescent phosphor, emitting green afterglow, represented by $SrAl_2O_4$:Eu, Dy is known (for example, see Patent Literature 1). In addition, as an oxysulfide-based phosphorescent phosphor emitting reddish afterglow, for example, a phosphorescent phosphor represented by $Y_2O_2S$:Ti,Mg,Gd is also known (for example, see Patent Literature 2).

Among these phosphorescent phosphors, in particular, variations of a phosphorescent phosphor having an afterglow falling in a range from orange to red have been demanded; however, because the orange-red afterglow emitting phosphorescent phosphor is a sulfide or an oxysulfide, the orange-red afterglow emitting phosphorescent phosphor suffers from a problem that sulfurous odor is emitted depending on the compound because of containing sulfur, in addition to the above-described problem. Accordingly, there have been demanded phosphorescent phosphors including chemically stable compounds as host crystals. In addition, the above-described oxysulfide-based phosphorescent phosphors have absorption spectral peaks in the ultraviolet light region, and hence suffer from a problem that the excitation efficiency with visible light is poor.

CITATION LIST

Patent Literature

Patent Literature 1: Japanese Patent No. 2543825
Patent Literature 2: Japanese Patent No. 4105759

SUMMARY OF INVENTION

Technical Problem

An object of the present invention is to provide a reddish light emitting phosphorescent phosphor being efficiently excited with visible light, emitting intense afterglow, and being chemically stable.

Solution to Problem

The present inventors studied various host crystals and various activators, and consequently, have discovered that a host crystal phosphor composed of an oxynitride activated with at least ytterbium (Yb) is useful as the reddish light emitting phosphorescent phosphor in accordance with the above-described object.

The phosphorescent phosphor according to a first aspect of the present invention comprises a compound represented by $MSi_2O_2N_2$:Yb,R wherein M is at least one metal element selected from strontium (Sr), calcium (Ca), barium (Ba), and magnesium (Mg), and R is at least one element selected from erbium (Er), holmium (Ho), gadolinium (Gd), praseodymium (Pr), terbium (Tb), dysprosium (Dy), neodymium (Nd), bismuth (Bi), scandium (Sc), and chromium (Cr). A reddish afterglow emitting phosphorescent phosphor is prepared by adopting as a host crystal the oxynitride represented by $MSi_2O_2N_2$, adding ytterbium (Yb) to the host crystal as an activator, and further adding as a co-activator the element represented by R as described above. Additionally, the metal element represented by M is preferably strontium (Sr), strontium (Sr) and calcium (Ca), or strontium (Sr) and barium (Ba).

The phosphorescent phosphor according to a second aspect of the present invention comprises a compound, represented by $MSi_2O_2N_2$:Yb,R wherein M is at least one metal element selected from strontium (Sr), calcium (Ca), barium (Ba), and magnesium (Mg), and R is at least one element selected from erbium (Er) and holmium (Ho), or at least one element selected from gadolinium (Gd), praseodymium (Pr), and terbium (Tb). A reddish afterglow emitting phosphorescent phosphor is prepared by adopting as a host crystal the oxynitride represented by $MSi_2O_2N_2$, adding ytterbium (Yb) to the host crystal as an activator, and further adding as a co-activator the element represented by R as described above. Additionally, the metal element represented by M is preferably strontium (Sr), strontium (Sr) and calcium (Ca), or strontium (Sr) and barium (Ba).

Advantageous Effects of Invention

According to the reddish light emitting phosphorescent phosphor of the present invention, it is possible to obtain a phosphorescent phosphor being excited efficiently with visible light, emitting reddish afterglow, and being chemically stable.

BRIEF DESCRIPTION OF DRAWINGS

FIG. 1 is a graph showing the particle size distribution of the phosphorescent phosphor of the sample 1-(1) of the present invention.

FIG. 2 is a powder X-ray diffraction chart of phosphorescent phosphor of the sample 1-(1) of the present invention.

FIG. 3 is a graph showing the excitation spectrum and the emission spectrum of the phosphorescent phosphor of the sample 1-(1) of the present invention.

FIG. 4 is a graph showing the excitation spectrum and the emission spectrum, of the phosphorescent phosphor of Comparative Example 1.

FIG. 5 is a graph showing the chromaticities of the phosphorescent phosphors of the sample 1-(1) of the present invention and Comparative Example 1.

FIG. 6 is a graph showing the emission spectrum of the white LED that is the excitation light source.

DESCRIPTION OF EMBODIMENTS

Next, an example of a process for producing the phosphorescent phosphor of the present invention is described as an embodiment of the present invention.

As phosphorescent phosphor raw materials, the following raw materials are prepared: a strontium (Sr) raw material such as strontium carbonate ($SrCO_3$); a calcium (Ca) raw material such as calcium carbonate ($CaCO_3$); a barium (Ba) raw material such as barium carbonate ($BaCO_3$); a magnesium (Mg) raw material such as basic magnesium carbonate; a silicon (Si) raw material such as silicon oxide ($SiO_2$); a raw material of ytterbium (Yb) as an activator such as ytterbium oxide ($Yb_2O_3$); and a raw material of erbium (Er) as an example used as a co-activator such as erbium oxide ($Er_2O_3$). In addition to these, the oxides, carbonates and the like of the elements necessary, as the constituent elements of the phosphorescent phosphor are prepared. It is to be noted that the phosphorescent phosphor raw materials are not limited to oxides and carbonates.

These phosphorescent phosphor raw materials are weighed to predetermined amounts, and are sufficiently mixed by using a ball mill mixer or the like to prepare a phosphorescent phosphor raw material mixed powder.

The prepared mixed powder is put in a heat-resistant vessel such as a quartz crucible, placed in an electric furnace, and primarily fired in a temperature range of 1000° C. or higher and 1200° C. or lower for 2 hours or more and 8 hours or less, in an air atmosphere.

The primary fired product obtained by primary firing is ground and sieved, and then, a predetermined amount of silicon nitride ($Si_3N_4$) is added to the thus treated primary fired product, and the resulting mixture is sufficiently mixed by using a ball mill or the like. In this case, for example, potassium nitrate ($KNO_3$) or strontium chloride ($SrCl_2$) may be appropriately added as a flux. The sufficiently mixed mixture is put in a heat-resistant vessel such as an alumina crucible, placed in an electric furnace, and secondarily fired at a temperature of 1400° C. or higher and 1600° C. or lower for 1 hour or more and 12 hours or less, in a reducing atmosphere. Examples of the reducing atmosphere include a nitrogen ($N_2$)+hydrogen ($H_2$) mixed gas. The secondary fired product obtained by firing is ground to powder and sieved, and thus a target phosphorescent phosphor is obtained. The amount of ytterbium (Yb) to be used as an activator added and the amount of the element to be used as a co-activator added can be appropriately selected in accordance with the target afterglow characteristics within a range from 0.00001 to 0.1 in terms of molar ratio in relation to 1 mol of the target phosphor. The amount of ytterbium (Yb) added is suitably within a range from 0.0001 to 0.04 in terms of molar ratio. The amount of erbium (Er) added is suitably within a range from 0.0005 to 0.05 in terms of molar ratio. The amount of holmium (Ho) added is suitably within a range from 0.0001 to 0.004 in terms of molar ratio.

Next, as the examples of the foregoing one embodiments, the phosphorescent phosphor of the present invention and the characteristics thereof are described by way of an example in which erbium (Er) is added as a co-activator.

Example 1

As the raw materials, the following were weighed: 146.15 g of strontium carbonate ($SrCO_3$) (0.99 mol in terms of Sr), 30.05 g of silicon oxide ($SiO_2$) (0.5 mol in terms of Si), 0.99 g of ytterbium oxide ($Yb_2O_3$) (0.005 mol in terms of Yb), and 0.96 g of erbium oxide ($Er_2O_3$) (0.005 mol in terms of Er). These raw materials were sufficiently mixed by using a ball mill.

The resulting mixture was put in a quartz crucible, placed in an electric furnace, and rapidly heated to 1100° C., fired for 4 hours and rapidly cooled down to room temperature in an air atmosphere. The primary fired product obtained by firing was ground and sieved, then 70.16 g of silicon nitride ($Si_3N_4$) (1.5 mol in terms of Si, and 2 mol in terms of N) was further added as a raw material to the primary fired product, and the resulting mixture was sufficiently mixed by using a ball mill. The resulting mixture was put in an alumina crucible, placed in an electric furnace, and fired at 1450° C. for 6 hours in a reducing atmosphere formed with a mixed gas composed of 97% of nitrogen ($N_2$) gas and 3% of hydrogen ($H_2$) gas (flow rate; 15 liters/hr). Subsequently, the mixture was cooled down to room temperature, and the obtained fired product was made to powder, through a grinding step and a sieving step, to synthesize a target phosphorescent phosphor represented by $SrSi_2O_2N_2$:Yb, Er. The resulting phosphorescent phosphor is referred to as the sample 1-(1). This sample 1-(1) was odorless.

In the same manner as described above, phosphorescent phosphors were synthesized under the conditions that the elements used as the raw materials and the amounts of the elements to be mixed in terms of the molar ratio were varied as shown in Table 1. The resulting phosphorescent phosphors are collectively referred to as the sample 1-(1) to the sample 1-(7). It is to be noted that the sample 1-(5) is a sample in which holmium (Ho) was further added.

TABLE 1

| Sample | Sr | Ca | Ba | Si | N | Yb | Er | Ho |
|---|---|---|---|---|---|---|---|---|
| Sample 1-(1) | 0.99 | | | 2 | 2 | 0.005 | 0.005 | |
| Sample 1-(2) | 0.98 | | | 2 | 2 | 0.0067 | 0.0133 | |
| Sample 1-(3) | 0.89 | 0.1 | | 2 | 2 | 0.005 | 0.005 | |
| Sample 1-(4) | 0.74 | 0.25 | | 2 | 2 | 0.005 | 0.005 | |
| Sample 1-(5) | 0.985 | | | 2 | 2 | 0.005 | 0.005 | 0.005 |
| Sample 1-(6) | 0.94 | | 0.05 | 2 | 2 | 0.005 | 0.005 | |
| Sample 1-(7) | 0.89 | | 0.1 | 2 | 2 | 0.005 | 0.005 | |

Of the synthesized samples 1-(1) to 1-(7), first, the sample 1-(1) was subjected to a particle size distribution measurement with a laser diffraction particle size distribution analyser (Model: SALD-2100, manufactured by Shimadzu Corp.). The results thus obtained are shown in FIG. 1. The sample 1-(1) was also subjected to a powder X-ray diffraction analysis with an X-ray diffractometer (Model: XRD-6100, manufactured by Shimadzu Corp.) using a Cu-tube. The resulting powder X-ray diffraction chart is shown in FIG. 2. As can be seen from FIG. 2, the host crystal was a $SrSi_2O_2N_2$ crystal.

Next, the sample 1-(1) was subjected to a measurement of an excitation spectrum and an emission spectrum with a Fluorescence Spectrophotometer (Model: F-7000, manufactured by Hitachi, Ltd.). The results thus obtained are shown in FIG. 3. As can be seen from FIG. 3, there is a remarkable excitation spectrum peak in the visible light region. As can be seen from the emission spectrum obtained by the measurement, the emission is a red emission having an emission peak wavelength of 608 nm, a dominant emission wavelength of 590 nm, a chromaticity x of 0.574 and a chromaticity y of 0.424. Next, as Comparative Example 1, a ZnS:Cu,Mn-type phosphorescent phosphor (Model: GSO, manufactured by Nemote Lumi-Material Co., Ltd.) was adopted, and the excitation spectrum and the emission spectrum thereof were measured in the same manner as described above. The results thus obtained are shown in FIG. 4. As can be seen from FIG. 4, this excitation spectrum is mainly found in the ultraviolet light region. As can be seen from this emission spectrum, the phosphorescent phosphor of Comparative Example 1 has a red-orange emission having an emission peak wavelength of 580 nm, a dominant emission wavelength of 581 nm, a chromaticity x of 0.520 and a chromaticity y of 0.477, and the color of the emission is a color clearly distinguishable from the emission color of the phosphorescent phosphor of the present invention. FIG. 5 shows, as a reference, a graph showing the chromaticities x and y of the phosphorescent phosphors of the sample 1-(1) of the present invention and Comparative Example 1 plotted thereon.

Additionally, for comparison, a sample $SrSi_2O_2N_2$:Yb was synthesized as Comparative Example 2 in the same manner as in the case of the sample 1-(1) by using the raw materials obtained By removing erbium (Er) as a co-activator from the raw materials of the sample 1-(1).

Next, the afterglow luminance characteristics of Comparative Example 1 and Comparative Example 2, and the samples 1-(1) to 1-(7) were evaluated.

A phosphorescent phosphor powder sample to be an evaluation object was put in an aluminum sample vessel, and then preliminarily heated at 100° C. for 1 hour in the dark to eliminate the afterglow. The afterglow-eliminated sample was irradiated for 10 minutes with light under the excitation conditions that a blue emission LED (peak wavelength: 455 nm) was used as an excitation light source, and a blue light having an illumination intensity of 250 1x was used. The afterglow luminance at every predetermined time from immediately after the completion of irradiation was measured by using a luminance meter (Model: LS-100, manufactured by Konica Minolta Holdings, Inc.). The results thus obtained are shown in Table 2, wherein the relative afterglow luminances of the samples and Comparative Example 2 are shown by taking the afterglow luminances of Comparative Example 1 as 100. It is to foe noted that the reason for selecting the blue light of the blue emission LED for the excitation light is based on the results of consideration of the excitation by currently rapidly prevailing LED illumination or by LED light of watch dials.

TABLE 2

| | Afterglow (Relative luminance) Excitation conditions: Blue LED-250 lx-10 minutes | | | | | |
|---|---|---|---|---|---|---|
| Sample | After 0.5 minutes | After 1 minutes | After 2 minutes | After 5 minutes | After 10 minutes | After 15 minutes |
| Comparative Example 1 | 100 | 100 | 100 | 100 | 100 | 100 |
| Comparative Example 2 | 3 | 3 | 3 | 2 | 4 | 3 |
| Sample 1-(1) | 130 | 117 | 97 | 66 | 60 | 53 |
| Sample 1-(2) | 101 | 98 | 89 | 67 | 55 | 48 |
| Sample 1-(3) | 112 | 105 | 93 | 72 | 60 | 55 |
| Sample 1-(4) | 94 | 89 | 83 | 67 | 60 | 55 |
| Sample 1-(5) | 50 | 55 | 67 | 98 | 133 | 158 |
| Sample 1-(6) | 57 | 51 | 44 | 31 | 28 | 21 |
| Sample 1-(7) | 64 | 57 | 49 | 34 | 28 | 28 |

As can be seen from the results shown in Table 2, for example, in each of the samples 1-(1) to 1-(4), the initial afterglow luminance is equivalent to or higher than the initial afterglow luminance in Comparative Example 1. As can be also seen from Table 2, the sample 1-(5) containing holmium (Ho) as added and thus activated with three elements is somewhat poorer in the initial afterglow luminance; however, after 5 minutes or later, the afterglow luminances of the sample 1-(5) are equivalent to or higher than the afterglow luminances of Comparative Example 1. The sample 1-(6) and the sample 1-(7), in each of which strontium (Sr) was partially replaced with barium (Ba), were poorer than Comparative Example 1 but each had a visually recognizable afterglow luminance. In addition, the afterglow of each of the samples was also visually identified; Comparative Example 1 exhibited a red-orange afterglow, and in contrast, the sample 1-(1) to the sample 1-(7) each exhibited a red afterglow, to be recognizable as obviously different from the color of the afterglow of Comparative Example 1. As can be seen from these results, the afterglows of the phosphorescent phosphors of the present invention are recognized to be distinguishably closer to red as compared with the afterglow of the phosphorescent phosphor of Comparative Example 1. As can also be seen, Comparative Example 2, to which only ytterbium (Yb) was added, exhibited only a meager afterglow luminance, namely, an unpractical afterglow luminance.

Next, the excitation conditions were altered for the purpose of verification, the excitation light source was altered to a white LED (a blue LED chip+a YAG-based phosphor), and the afterglow luminance characteristics of each of Comparative Example 1 and the sample 1-(3) were examined in the same manner as described above. The excitation conditions were such that the white LED (see FIG. 6 for the emission spectrum) was used, the illumination intensity was set at 2,000 1x, and the irradiation time was set at 5 minutes. The results thus obtained are shown in Table 3, wherein the relative afterglow luminances are shown by taking the afterglow luminances of Comparative Example 1 as 100.

TABLE 3

| | Afterglow (Relative luminance) Excitation conditions: White LED-2000 lx-5 minutes | | | | | |
|---|---|---|---|---|---|---|
| Sample | After 0.5 minutes | After 1 minutes | After 2 minutes | After 5 minutes | After 10 minutes | After 15 minutes |
| Comparative Example 1 | 100 | 100 | 100 | 100 | 100 | 100 |
| Sample 1-(3) | 111 | 113 | 81 | 84 | 72 | 69 |

As can be seen from the results shown in Table 3, the afterglow luminance characteristics of the sample 1-(3) in the case where the excitation by irradiation was performed by using the white LED showed the same tendency as the afterglow luminance based on the excitation with the blue LED.

Example 2

Next, as Example of another embodiment, examples in each of which a flux was added during the secondary firing are described.

A primary fired product was prepared by the same steps as in the sample 1-(1) of Example 1, until the primary firing. The primary fired product obtained by firing was ground and sieved, then 3.08 g of potassium nitrate ($KNO_3$) (corresponding to 1.5% by mass of the total of the primary fired product+silicon nitride) was added as a flux to the primary fired product together with 70.16 g of silicon nitride ($Si_3N_4$) (1.5 mol in terms of Si, and 2 mol in terms of N) as a raw material, and the resulting mixture was sufficiently mixed by using a ball mill. The resulting mixture was put in an alumina crucible, and fired in an electric furnace at 1450° C. for 6 hours in a reducing atmosphere formed with a mixed gas composed of 97% of nitrogen ($N_2$) gas and 3% of hydrogen ($H_2$) gas (flow rate: 15 liters/hour). Subsequently, the mixture was cooled down to room temperature, and the obtained fired product was made to powder through a grinding step and a sieving step to synthesize a target phosphorescent phosphor. The resulting phosphorescent phosphor is referred to as the sample 2-(2). The synthesized sample 2-(2) was odorless.

In the same manner as described above, phosphorescent phosphors were synthesized under the conditions that the elements used as the raw materials and the amounts of the elements to be mixed in terms of the molar ratio were varied as shown in Table 4, and the resulting phosphorescent phosphors are collectively referred to as the sample 2-(1) to the sample 2-(4).

TABLE 4

| Sample | Sr | Si | N | Yb | Er |
|---|---|---|---|---|---|
| Sample 2-(1) | 0.9925 | 2 | 2 | 0.0025 | 0.005 |
| Sample 2 (2) | 0.99 | 2 | 2 | 0.005 | 0.005 |
| Sample 2-(3) | 0.985 | 2 | 2 | 0.005 | 0.01 |
| Sample 2-(4) | 0.97 | 2 | 2 | 0.01 | 0.02 |

The afterglow luminances of each of the synthesized sample 2-(1) to the synthesized sample 2-(4) were measured by irradiating each sample with the blue light from a LED as the excitation light, in the same manner as in Example 1. The results thus obtained are shown in Table 5, wherein the relative afterglow luminances of each sample are shown by taking the afterglow luminances of Comparative Example 1 as 100.

TABLE 5

| | Afterglow (Relative luminance) Excitation conditions: Blue LED-250 lx-10 minutes | | | | | | |
|---|---|---|---|---|---|---|---|
| Sample | After 0.5 minutes | After 1 minutes | After 2 minutes | After 5 minutes | After 10 minutes | After 15 minutes | After 20 minutes |
| Comparative Example 1 | 100 | 100 | 100 | 100 | 100 | 100 | 100 |
| Sample 2-(1) | 140 | 142 | 136 | 116 | 103 | 97 | 94 |
| Sample 2-(2) | 134 | 139 | 134 | 109 | 83 | 66 | 58 |
| Sample 2-(3) | 139 | 140 | 136 | 121 | 111 | 103 | 103 |
| Sample 2-(4) | 133 | 129 | 117 | 88 | 66 | 58 | 57 |

As can be seen from the results shown in Table 5, the initial afterglow luminances of all the samples are 130% or more of the initial afterglow luminance of Comparative Example 1. As can be also seen, in each of the samples 2-(1) and 2-(3), the afterglow luminances after 5 minutes or later are also equivalent to or higher than the corresponding afterglow luminances of Comparative Example 1, respectively. As can be seen from what has been described above, the addition of erbium as a co-activator allows excellent phosphorescent phosphors having a high initial afterglow luminance to be synthesized. It has also been verified that the afterglow luminance improvement effect due to the flux is obtained. It is to be noted that the same effect was also verified when strontium chloride ($SrCl_2$) was used a flux.

Example 3

Next, as Example of another embodiment, examples in each of which holmium (Ho) was added as a co-activator are described.

Phosphorescent phosphors represented by $SrSi_2O_2N_2$:Yb, Ho were synthesized in the same manner as in Example 2 except, that holmium (Ho) was added as a co-activator in place of erbium (Er), and the amounts of the raw materials to be mixed in terms of molar ratio were altered as shorn in Table 6. The resulting phosphorescent phosphors are referred to as the sample 3-(1) to the sample 3-(9). It is to be noted that in each of the sample 3-(4) to the sample 3-(9), Sr was partially replaced with Ca.

TABLE 6

| Sample | Sr | Ca | Si | N | Yb | Ho |
|---|---|---|---|---|---|---|
| Sample 3-(1) | 0.99875 | | 2 | 2 | 0.001 | 0.00025 |
| Sample 3-(2) | 0.99375 | | 2 | 2 | 0.005 | 0.00125 |
| Sample 3-(3) | 0.99125 | | 2 | 2 | 0.007 | 0.00175 |
| Sample 3-(4) | 0.89375 | 0.1 | 2 | 2 | 0.005 | 0.00125 |
| Sample 3-(5) | 0.79375 | 0.2 | 2 | 2 | 0.005 | 0.00125 |
| Sample 3-(6) | 0.69375 | 0.3 | 2 | 2 | 0.005 | 0.00125 |
| Sample 3-(7) | 0.79875 | 0.2 | 2 | 2 | 0.001 | 0.00025 |
| Sample 3-(8) | 0.69875 | 0.3 | 2 | 2 | 0.001 | 0.00025 |
| Sample 3-(9) | 0.59875 | 0.4 | 2 | 2 | 0.001 | 0.00025 |

The afterglow luminances of each of the synthesized sample 3-(1) to the synthesized sample 3-(9) were measured by irradiating each sample with the blue light from a LED as the excitation light in the same manner as in Example 1. The results thus obtained are shown in Table 7, wherein the relative afterglow luminances of each sample are shown by taking the afterglow luminances of Comparative Example 1 as 100.

TABLE 7

Afterglow (Relative luminance) Excitation
conditions: Blue LED-250 lx-10 minutes

| Sample | After 0.5 minutes | After 1 minutes | After 2 minutes | After 5 minutes | After 10 minutes | After 15 minutes | After 20 minutes |
|---|---|---|---|---|---|---|---|
| Comparative Example 1 | 100 | 100 | 100 | 100 | 100 | 100 | 100 |
| Sample 3-(1) | 33 | 39 | 49 | 78 | 115 | 148 | 169 |
| Sample 3-(2) | 20 | 28 | 42 | 70 | 105 | 131 | 153 |
| Sample 3-(3) | 23 | 28 | 34 | 42 | 61 | 72 | 86 |
| Sample 3-(4) | 34 | 46 | 63 | 91 | 122 | 131 | 133 |
| Sample 3-(5) | 48 | 62 | 81 | 103 | 118 | 119 | 133 |
| Sample 3-(6) | 56 | 67 | 81 | 98 | 109 | 111 | 124 |
| Sample 3-(7) | 46 | 60 | 78 | 105 | 130 | 145 | 153 |
| Sample 3-(8) | 48 | 62 | 81 | 107 | 121 | 128 | 138 |
| Sample 3-(9) | 37 | 45 | 56 | 88 | 82 | 87 | 81 |

As can be seen from the results shown in Table 7, in each of the sample 3-(1) to the sample 3-(9), the afterglow luminance after 5 minutes is approximately equivalent to the afterglow luminance after 5 minutes, of Comparative Example 1, and the afterglow luminances after 10 minutes or later are equivalent to or higher than the afterglow luminances after 10 minutes or later of Comparative Example 1. As can be seen from what has been described above, the addition of holmium (Ho) as a co-activator allows excellent phosphorescent phosphors having high afterglow luminances after 5 minutes or later to be synthesized.

Example 4

Next, as Example of another embodiment, examples in each of which both of erbium (Er) and holmium (Ho) were added as co-activators are described.

Phosphorescent phosphors represented by $SrSi_2O_2N_2$:Yb, Er, Ho were synthesized in the same manner as in Example 2 except that holmium (Ho) was added as well as Erbium (Er) as co-activators, and the amounts of the raw materials to be mixed in terms of molar ratio were altered as shown in Table 8. The resulting phosphorescent phosphors are referred to as the sample 4-(1) to the sample 4-(4).

TABLE 8

| Sample | Sr | Si | N | Yb | Er | Ho |
|---|---|---|---|---|---|---|
| Sample 4-(1) | 0.97875 | 2 | 2 | 0.005 | 0.015 | 0.00125 |
| Sample 4-(2) | 0.98375 | 2 | 2 | 0.005 | 0.01 | 0.00125 |
| Sample 4-(3) | 0.98333 | 2 | 2 | 0.005 | 0.01 | 0.00167 |
| Sample 4-(4) | 0.98875 | 2 | 2 | 0.005 | 0.005 | 0.00125 |

The afterglow luminances of each, of the synthesized sample 4-(1) to the synthesized sample 4-(4) were measured by irradiating each sample with the blue light from a LED as the excitation light, in the same manner as in Example 1. The results thus obtained are shown in Table 9, wherein the relative afterglow luminances of each sample are shown by taking the afterglow luminances of Comparative Example 1 as 100.

TABLE 9

Afterglow (Relative luminance) Excitation
conditions: Blue LED-250 lx-10 minutes

| Sample | After 0.5 minutes | After 1 minutes | After 2 minutes | After 5 minutes | After 10 minutes | After 15 minutes | After 20 minutes |
|---|---|---|---|---|---|---|---|
| Comparative Example 1 | 100 | 100 | 100 | 100 | 100 | 100 | 100 |
| Sample 4-(1) | 111 | 113 | 108 | 97 | 87 | 83 | 84 |
| Sample 4-(2) | 102 | 101 | 98 | 94 | 99 | 109 | 112 |
| Sample 4-(3) | 107 | 106 | 104 | 103 | 123 | 132 | 150 |
| Sample 4-(4) | 48 | 44 | 43 | 45 | 59 | 59 | 67 |

As can be seen from the results shows in Table 9, in each, of the sample 4-(1) to the sample 4-(4), the afterglow luminances are approximately equivalent to or higher than the afterglow luminances of Comparative Example 1, As can be seen from what has been described above, the addition of both of erbium (Er) and holmium (Ho) as co-activators allows phosphorescent phosphors having afterglow luminances, analogous to the afterglow luminances of Comparative Example 1 to be synthesized.

Example 5

Next, as Example of another embodiment, examples in each of which gadolinium (Gd), praseodymium (Pr) or terbium (Tb) is added as a co-activator are described.

Phosphorescent phosphors were synthesized in the same manner as in Example 2 except that gadolinium (Gd), praseodymium (Pr) or terbium (Tb) was added as a co-activator in place of erbium (Er), and the elements used as the raw materials and the amounts thereof to be mixed in terms of molar ratio were altered as shown in Table 10. The resulting phosphorescent phosphors are referred to as the sample 5-(1) to the sample 5-(9).

TABLE 10

| Sample | Sr | Si | N | Yb | Gd | Pr | Tb |
|---|---|---|---|---|---|---|---|
| Sample 5-(1) | 0.9925 | 2 | 2 | 0.005 | 0.0025 | | |
| Sample 5-(2) | 0.99 | 2 | 2 | 0.005 | 0.005 | | |
| Sample 5-(3) | 0.985 | 2 | 2 | 0.005 | 0.01 | | |
| Sample 5-(4) | 0.9925 | 2 | 2 | 0.005 | | 0.0025 | |
| Sample 5-(5) | 0.99 | 2 | 2 | 0.005 | | 0.005 | |
| Sample 5-(6) | 0.985 | 2 | 2 | 0.005 | | 0.01 | |
| Sample 5-(7) | 0.9925 | 2 | 2 | 0.005 | | | 0.0025 |
| Sample 5-(8) | 0.99 | 2 | 2 | 0.005 | | | 0.005 |
| Sample 5-(9) | 0.985 | 2 | 2 | 0.005 | | | 0.01 |

The afterglow luminances of each of the synthesized sample 5-(1) to the synthesized sample 5-(9) were measured by irradiating each sample with the blue light from a LED as the excitation light, in the same manner as in Example 1. The results thus obtained are shown in Table 11, wherein the relative afterglow luminances of each sample are shown by taking the afterglow luminances of Comparative Example 1 as 100.

TABLE 11

| | Afterglow (Relative luminance) Excitation conditions: Blue LED-250 lx-10 minutes | | | | | | |
|---|---|---|---|---|---|---|---|
| Sample | After 0.5 minutes | After 1 minutes | After 2 minutes | After 5 minutes | After 10 minutes | After 15 minutes | After 20 minutes |
| Comparative Example 1 | 100 | 100 | 100 | 100 | 100 | 100 | 100 |
| Sample 5-(1) | 61 | 54 | 46 | 39 | 36 | 36 | 42 |
| Sample 5-(2) | 59 | 52 | 44 | 36 | 33 | 31 | 34 |
| Sample 5-(3) | 58 | 56 | 52 | 46 | 41 | 43 | 42 |
| Sample 5-(4) | 63 | 62 | 62 | 63 | 59 | 52 | 51 |
| Sample 5-(5) | 59 | 64 | 69 | 74 | 78 | 69 | 76 |
| Sample 5-(6) | 43 | 45 | 50 | 55 | 55 | 52 | 53 |
| Sample 5-(7) | 56 | 51 | 47 | 45 | 42 | 41 | 40 |
| Sample 5-(8) | 58 | 51 | 46 | 42 | 42 | 35 | 23 |
| Sample 5-(9) | 48 | 40 | 35 | 33 | 26 | 29 | 23 |

As can be seen from the results shown in Table 11, the afterglow luminances of the sample 5-(1) to the sample 5-(9) are approximately 50% to 70% of the afterglow luminances of Comparative Example 1, but even such afterglow luminances were sufficiently visually recognizable. As can be seen from what has been described above, the addition of gadolinium (Gd), praseodymium (Pr), or terbium (Tb) as a co-activator allows phosphorescent phosphors being poorer than Comparative Example 1, but having visually recognizable afterglow luminances to be synthesized Next, as Example of another embodiment, samples in each of which strontium (Sr) is partially replaced with magnesium (Mg) were also synthesized in the same manner as described above. In addition, samples in each of which dysprosium (Dy), neodymium (Nd), bismuth (Bi), scandium (Sc), or chromium (Cr) was added other than erbium (Er) as a co-activator were also synthesized in the same manner as described above, and the afterglow luminance characteristics of these phosphorescent phosphors were evaluated in the same manner as described above. Consequently, in the same manner as described above, each of these phosphorescent phosphors was verified to have a visually recognizable afterglow luminance.

Example 6

Next, the light resistance of the phosphorescent phosphor of the present invention was compared with the light resistance of a conventional sulfide-based phosphorescent phosphor (GSO).

The sample 1-(1) of Example 1, a phosphorescent phosphor of the present invention, and Comparative Example 1, a conventional sulfide-based phosphorescent phosphor, were each mixed with a transparent screen ink (VG Screen Ink; 0.00 Medium, manufactured by Teikoku Printing Inks Mfg. Co., Ltd.), in a mass ratio of 1:1; the resulting mixtures were each applied to an aluminum plate with an applicator, spontaneously dried to prepare a coating film sample. Each of these coating film samples was continuously irradiated at a high humidity with a light including ultraviolet light from a high pressure mercury lamp. Before the test, after an elapsed time of 70 hours and at an elapsed time of 160 hours, the afterglow luminances of each of the coating film samples were measured by exciting the sample by irradiating the sample with blue light from a blue LED as a excitation light source in the same manner as in Example 1; in each of the samples, by comparing the afterglow luminances before and after the test, the maintenance rate of the afterglow luminances was derived, and the light resistance was evaluated.

TABLE 12

| | | Afterglow (Maintenance rate of relative luminance) Excitation conditions: Blue LED-250 lx-10 minutes | | |
|---|---|---|---|---|
| Sample | Irradiation time | After 1 minute | After 5 minutes | After 10 minutes |
| Comparative Example 1 | 0 hour | 100% | 100% | 100% |
| | 70 hours | 93% | 98% | 93% |
| | 160 hours | 78% | 78% | 75% |
| Sample 1-(1) | 0 hour | 100% | 100% | 100% |
| | 70 hours | 99% | 96% | 98% |
| | 160 hours | 95% | 91% | 83% |

As can be seen from the results of the light resistance test, as compared with Comparative Example 1, a sulfide-based phosphorescent phosphor, the sample 1-(1) of the present invention has a higher afterglow luminance maintenance rate, is lower in deterioration, and has a higher light resistance. This can be understood as the effect due to the fact that the host crystal of the phosphorescent phosphor of the present invention is an oxynitride-based $SrSi_2O_2N_2$ crystal.

Example 7

Next, by assuming a usage form for watch dials or the like, with respect to the afterglow luminances characteristics in the coating film sample, the phosphorescent phosphor of the present invention was compared with the conventional sulfide-based phosphorescent phosphor.

Among the above-described samples, the sample 2-(3), the sample 4-(3), and Comparative Example 1 were selected as the objects; each of the phosphorescent phosphors to be the objects and the transparent screen ink were mixed with each other in a mass ratio of 1:1 in the same manner as in Example 6, to prepare an ink mixture. Each of the prepared ink mixtures was applied to a white-primer-coated aluminum plate by a screen printing to form a coating film, and spontaneously dried to prepare a coating film sample. The coating film was formed in such a way that the content of the phosphorescent phosphor in the coating film was approximately 60 g/m$^2$ in terms of the phosphorescent phosphor mass per unit area.

Each of the obtained coating film samples was preliminarily heated at 100° C. for 1 hour in the dark to eliminate the afterglow. Subsequently, a standard light source D65 was used as an excitation light source, and each of the coating film samples was irradiated with a light having an illumination intensity of 500 1x for 10 minutes. The afterglow luminance of each coating film sample at every predetermined time from immediately after the completion of irradiation, was measured by using a luminance meter (Chromaticity Luminance Meter, BM-5A, manufactured by Topcon Corp.). The results thus obtained are shown in Table 13, wherein the relative afterglow luminances of each sample are shown by taking the afterglow luminances of Comparative Example 1 as 100.

TABLE 13

| Coating film sample | Afterglow (Relative luminance) Excitation conditions: D65-500 lx-10 minutes | | | | | | |
|---|---|---|---|---|---|---|---|
| | After 1 minutes | After 2 minutes | After 5 minutes | After 10 minutes | After 20 minutes | After 30 minutes | After 60 minutes |
| Comparative Example 1 coating film | 100 | 100 | 100 | 100 | 100 | 100 | 100 |
| Sample 2-(3) coating film | 157 | 197 | 216 | 214 | 182 | 201 | 205 |
| Sample 4-(3) coating film | 114 | 128 | 161 | 195 | 236 | 299 | 339 |

As can be seen from the results shown in Table 13, the afterglow luminances of each of the coating film samples are all much higher than the afterglow luminances of the coating film sample of Comparative Example 1. Moreover, even when compared with the afterglow luminances of the phosphorescent phosphor powders shown in Table 5 and Table 9, the afterglow luminances of the coating film samples shown in Table 13 are remarkably higher than the afterglow luminances of the coating film sample of Comparative Example 1 and thus extremely excellent. As can be seen from what has been described above, the phosphorescent phosphors of the present invention are excellent phosphorescent phosphors exhibiting remarkably high afterglow luminances in the coating films; the phosphorescent phosphors of the present invention can be used for signs, marks, and the like formed with coating films, in addition to the application to watches or the like.

As described above, the phosphorescent phosphors of the present invention provide excellent phosphorescent phosphors efficiently excited with visible light, emitting reddish afterglow, and are chemically stable. By appropriately selecting the elements of the co-activators and by regulating the amounts of the activators and the co-activators added, it is possible to obtain phosphorescent phosphors having various afterglow luminance characteristics suitable for the purposes.

INDUSTRIAL APPLICABILITY

The phosphorescent phosphor of the present invention can be used in various applications, and in particular, can be used suitably in the application to indoor applications such as indoor signs undergoing increasing use of LED illumination sources because the phosphorescent phosphor of the present invention is efficiently excited by LED to emit light. In addition, the phosphorescent phosphor of the present invention can be suitably used for watch dials and watch hands, because the phosphorescent phosphor of the present invention is efficiently excited with LED light of a watch such as a wrist watch and emits light.

The invention claimed is:

1. A reddish light emitting phosphorescent phosphor, comprising a compound represented by:
   $MSi_2O_2N_2$:Yb,R;
   wherein:
   M is at least one metal element selected from the group consisting of strontium (Sr), calcium (Ca), barium (Ba), and magnesium (Mg); and
   R is at least one element selected from the group consisting of erbium (Er), holmium (Ho), praseodymium (Pr), dysprosium (Dy), neodymium (Nd), bismuth (Bi), scandium (Sc), and chromium (Cr).

2. The reddish light emitting phosphorescent phosphor according to claim 1, wherein R is at least one element selected from the group consisting of erbium (Er) and holmium (Ho).

3. The reddish light emitting phosphorescent phosphor according to claim 1, wherein R includes praseodymium (Pr).

4. The reddish light emitting phosphorescent phosphor according to claim 1, wherein M is strontium (Sr), strontium (Sr) and calcium (Ca), or strontium (Sr) and barium (Ba).

5. The reddish light emitting phosphorescent phosphor according to claim 2, wherein M is strontium (Sr), strontium (Sr) and calcium (Ca), or strontium (Sr) and barium (Ba).

6. The reddish light emitting phosphorescent phosphor according to claim 3, wherein M is strontium (Sr), strontium (Sr) and calcium (Ca), or strontium (Sr) and barium (Ba).

7. A watch dial, comprising the reddish light emitting phosphorescent phosphor according to claim 1.

8. A watch hand, comprising the reddish light emitting phosphorescent phosphor according to claim 1.

9. The reddish light emitting phosphorescent phosphor according to claim 1, wherein M is at least one metal element selected from the group consisting of strontium (Sr), calcium (Ca), barium (Ba), and magnesium (Mg), and R is erbium (Er).

10. The reddish light emitting phosphorescent phosphor according to claim 1, wherein M is at least one metal element selected from the group consisting of strontium (Sr), calcium (Ca), barium (Ba), and magnesium (Mg), and R includes erbium (Er) and at least one element selected from the group consisting of holmium (Ho), praseodymium (Pr), dysprosium (Dy), neodymium (Nd), bismuth (Bi), scandium (Sc), and chromium (Cr).

11. The reddish light emitting phosphorescent phosphor according to claim 1, wherein M is at least one metal element selected from the group consisting of strontium (Sr), calcium (Ca), barium (Ba), and magnesium (Mg), and R includes at least one element selected from the group consisting of holmium (Ho), praseodymium (Pr), dysprosium (Dy), neodymium (Nd), bismuth (Bi), scandium (Sc), and chromium (Cr).

12. The reddish light emitting phosphorescent phosphor according to claim 1, wherein M includes strontium (Sr).

13. A watch dial, comprising the reddish light emitting phosphorescent phosphor according to claim 9.

14. A watch hand, comprising the reddish light emitting phosphorescent phosphor according to claim 9.

15. A watch dial, comprising the reddish light emitting phosphorescent phosphor according to claim 10.

16. A watch hand, comprising the reddish light emitting phosphorescent phosphor according to claim 10.

17. A watch dial, comprising the reddish light emitting phosphorescent phosphor according to claim 11.

18. A watch hand, comprising the reddish light emitting phosphorescent phosphor according to claim 11.

19. A watch dial, comprising the reddish light emitting phosphorescent phosphor according to claim 12.

20. A watch hand, comprising the reddish light emitting phosphorescent phosphor according to claim 12.

* * * * *